United States Patent
Hwang et al.

(10) Patent No.: US 6,741,339 B2
(45) Date of Patent: May 25, 2004

(54) APPARATUS FOR INSPECTING COLLIMATOR

(75) Inventors: Myeon-soon Hwang, Suwon (KR);
Tai-hwan Park, Suwon (KR);
Hong-suk Sun, Suwon (KR);
Byung-gon Kim, Seoul (KR);
Myoung-woon Kim, Seoul (KR);
Suk-chan Lee, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/197,820

(22) Filed: Jul. 19, 2002

(65) Prior Publication Data

US 2003/0156277 A1 Aug. 21, 2003

(30) Foreign Application Priority Data

Feb. 20, 2002 (KR) .......................... 2002-9072

(51) Int. Cl.[7] .................................. G01B 9/00
(52) U.S. Cl. ....................................... 356/124
(58) Field of Search ............. 356/124–127, 356/73.1; 385/134

(56) References Cited

U.S. PATENT DOCUMENTS

| | | | |
|---|---|---|---|
| 5,004,346 A | | 4/1991 | KuMichael |
| 5,090,802 A | * | 2/1992 | Longhurst .................. 356/73.1 |
| 5,148,233 A | * | 9/1992 | Imamura et al. ......... 356/243.1 |
| 5,841,591 A | | 11/1998 | Zhu et al. |
| 6,168,319 B1 | * | 1/2001 | Francis ......................... 385/79 |
| 6,459,478 B1 | * | 10/2002 | Schmidt et al. ............ 356/73.1 |
| 6,646,730 B2 | * | 11/2003 | Hwang et al. .............. 358/124 |

* cited by examiner

Primary Examiner—Hoa Q. Pham
(74) Attorney, Agent, or Firm—Staas & Halsey LLP (57) ABSTRACT

An apparatus for inspecting a collimator including a pigtail formed with first and second fibers, a GRIN lens disposed coaxially relative to the pigtail, and a glass tube supporting the pigtail and the GRIN lens in a single unit, to inspect optical properties of the collimator, comprising an inspection table; a gripping part, which is provided on the inspection table, gripping the collimator subject to inspection; a light supplying part transmitting a predetermined optical signal to the first fiber; a light receiving part, which is connected to the second fiber, receiving an optical signal returned from the second fiber, entering the first fiber; a measuring part calculating a value of the predetermined optical signal, which entered the first fiber, and a value of the optical signal, which returned from the second fiber; and an image displaying part displaying the value obtained from the measuring part. With this configuration, the collimator can be inspected in part, thereby increasing the product reliability of the collimator.

8 Claims, 5 Drawing Sheets

FIG. 4

# APPARATUS FOR INSPECTING COLLIMATOR

CROSS-REFERENCE TO RELATED APPLICATIONS

This application claims the benefit of Korean Application No. 2002-9072, filed Feb. 20, 2002, in the Korean Intellectual Property Office, the disclosure of which is incorporated herein by reference.

BACKGROUND OF THE INVENTION

1. Field of the Invention

The present invention relates to an apparatus for inspecting a collimator.

2. Description of the Related Art

A collimator refers to a device for optical communication, which transforms light, which enters by a light source into a parallel ray. The collimator is usually used, as a component, in a variety of equipment including optical communication equipment, semiconductor equipment, etc.

Figure 1:
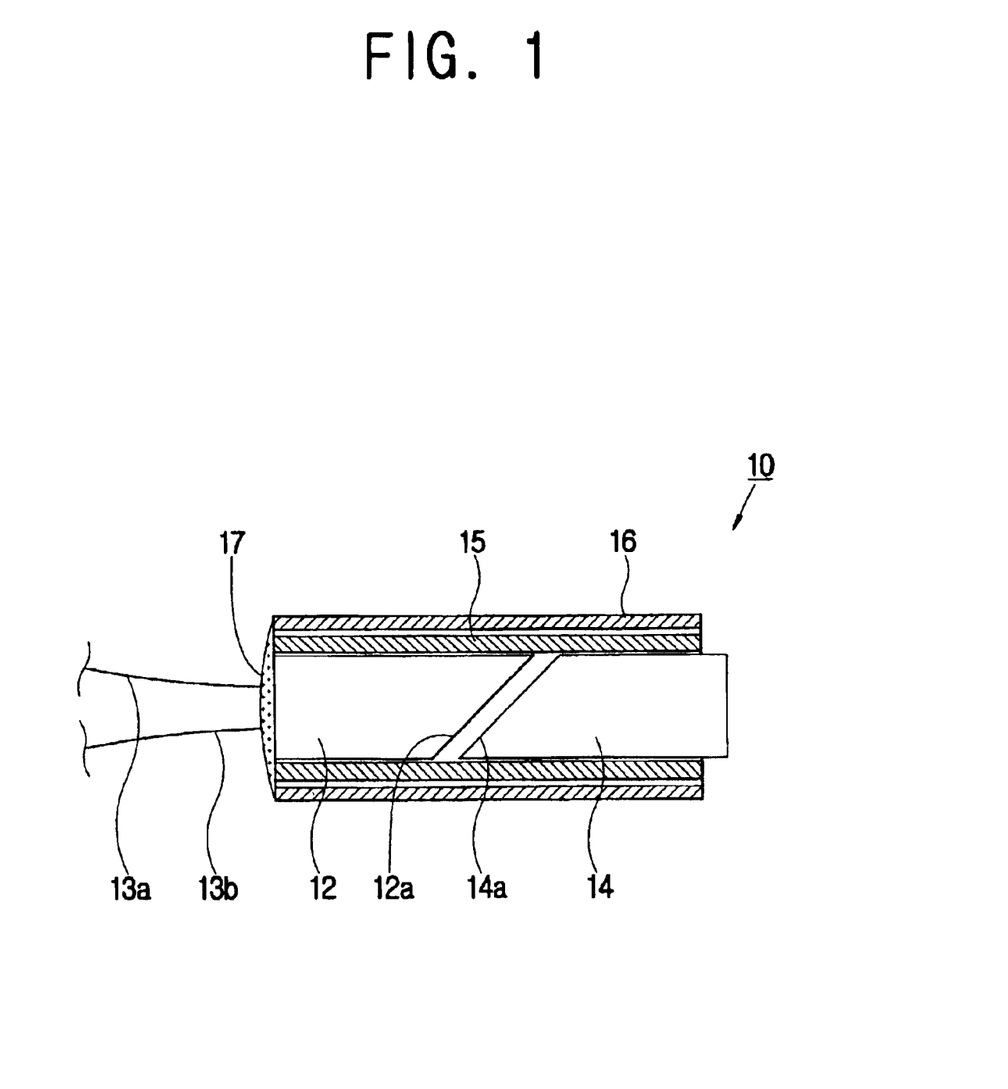
FIG. 1 is a sectional view of a collimator.

A typical collimator, as shown in FIG. 1, comprises a pigtail 12 and a GRIN (gradient index) lens 14, both being arranged on a mutual coaxial line, a glass tube 15 receiving and supporting the pigtail 12 and the GRIN lens 14, and a tubular metal sleeve 16 protecting the glass tube 15 on the outside thereof.

In the pigtail 12 formed of glass is provided a pair of fibers 13a and 13b forming an incoming channel of a predetermined light in one end of the pigtail 12, through which the light enters. In the other end of the pigtail 12 is formed a predetermined sloping side 12a.

One end of the GRIN lens 14 disposed coaxially relative to the pigtail 12 is formed as a sloping side 14a corresponding to the predetermined sloping side 12a of the pigtail 12. The sloping side 12a of the pigtail 12 and the sloping side 14a of the GRIN lens 14 are slopingly disposed oppositely to each other.

To manufacture a collimator 10 with this configuration, a GRIN lens 14 is fixedly inserted into a glass tube 15. One end of the GRIN lens 14, on which a sloping side 14a is formed, is inserted into the glass tube 15 and the other end thereof is disposed so as to be exposed to the outside of the glass tube 15 with a predetermined distance of the exposed GRIN lens 14.

If the GRIN lens 14 is supportedly received in one side of the glass tube 15, a pigtail 12 is inserted from the other side thereof. One end of the pigtail 12, on which the predetermined sloping side 12a is formed, is received within the glass tube 15 and then the pigtail 12 is slopingly displaced so as to be opposite to the sloping side 14a of the GRIN lens 14 already having been supportedly inserted within the glass tube 15.

At this time, the predetermined sloping side 12a of the pigtail 12 is slopingly disposed relative to the sloping side 14a of the GRIN lens 12 through an aligning process so as to comply with predetermined conditions for optical properties. Thereafter, if the collimator 10 is in compliance with some predetermined conditions, the pigtail 12 is fixed within the glass tube 15.

If the GRIN lens 14 and the pigtail 12 are supportedly received within the glass tube 15, the glass tube 15 is inserted into the tubular metal sleeve 16. Then, the glass tube 15 and the metal tubular sleeve 16 are coated with epoxy resins 17, and the glass tube 15 and the tubular metal sleeve 16 are fixedly combined with each other. With these processes, manufacture of the conventional collimator 10 is completed.

However, in a conventional art, no separate apparatus for inspecting the collimator 10 manufactured through the above-described processes is available, thereby causing the product reliability of the conventional collimator to decrease accordingly.

SUMMARY OF THE INVENTION

The present invention is an apparatus for inspecting properties of a collimator by inspecting the collimator in part, thereby allowing the product reliability to increase.

Additional objects and advantages of the invention will be set forth in part in the description which follows and, in part, will be obvious from the description, or may be learned by practice of the invention.

This and other objects of the present invention may be achieved by providing an apparatus for inspecting a collimator including a pigtail formed with first and second fibers, a GRIN lens disposed coaxially relative to the pigtail, and a glass tube supporting the pigtail and the GRIN lens in a single unit, to inspect optical properties of the collimator, the apparatus comprising an inspection table; a gripping part provided on the inspection table, gripping the collimator subject to inspection; a light supplying part transmitting a predetermined optical signal to the first fiber; a light receiving part connected to the second fiber, receiving an optical signal returned from the second fiber, after entering the first fiber; a measuring part calculating a value of the predetermined optical signal which entered the first fiber and a value of the optical signal returned from the second fiber; and an image displaying part displaying a value obtained from the measuring part.

The measuring part may deduct the value of the optical signal returned from the second fiber from the value of the predetermined optical signal which entered the first fiber, to obtain a value of return loss.

The apparatus may further comprise a total reflection mirror positioned coaxially relative to the collimator at a predetermined distance from the collimator and totally reflecting the predetermined optical signal which entered the first fiber.

The measuring part may deduct a value of the optical signal returned from the second fiber after being totally reflected by the total reflection mirror from the value of the predetermined optical signal which entered the first fiber, to thereby obtain a value of reflected insertion loss.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Reference will now made in detail to the present preferred embodiments of the present invention, examples of which are illustrated in the accompanying drawings, wherein like reference numerals refer to the like elements throughout. The embodiments are described below in order to explain the present invention by referring to the figures. In particular, the same elements and components with respect to FIG. 1 will be assigned the same reference numerals.

Figure 2:
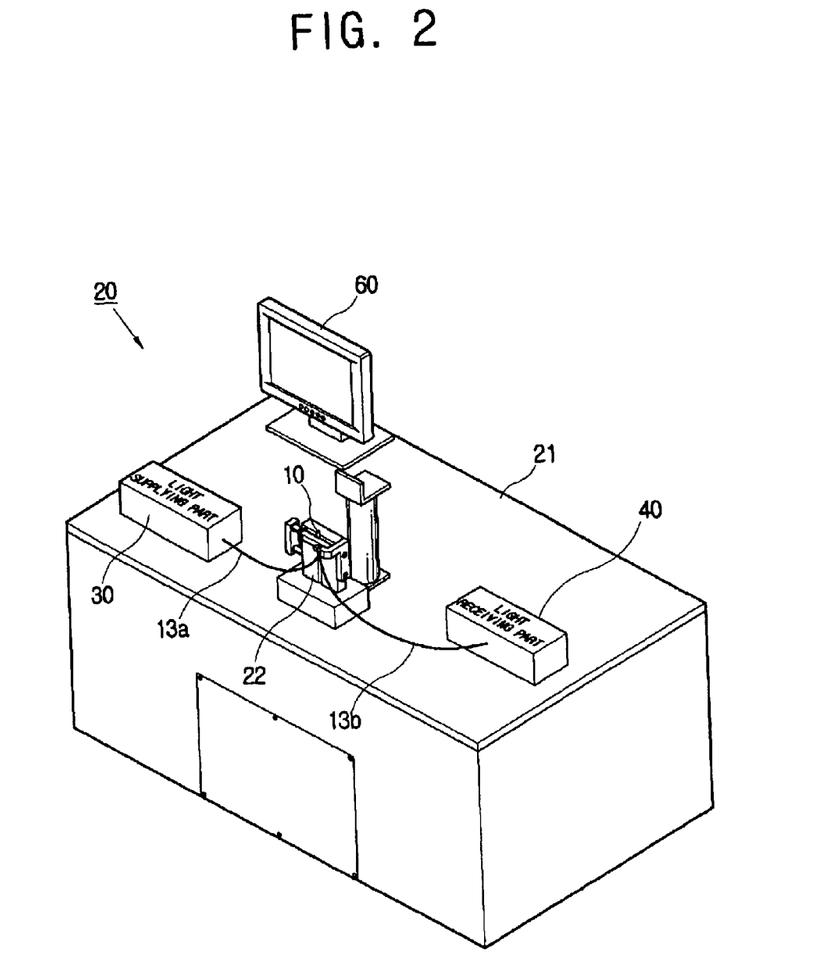
FIG. 2 is a perspective view of an apparatus for inspecting the collimator according to a first embodiment of the present invention.

As described in FIG. 2, an apparatus 20 for inspecting a collimator comprises an inspection table 21, a gripping part 22 gripping the collimator 10 which is a subject of inspection, a light supplying part 30 transmitting a predetermined optical signal to the collimator 10, a light receiving part 40 receiving an optical signal entered and returned from the collimator 10, a measuring part 50 (see FIG. 3) calculating a value of the predetermined optical signal, which entered into the collimator 10, and a value of the optical signal, which returned from the collimator 10, and an image displaying part 60 connected to the measuring part 50, thereby displaying values, which are calculated from the measuring part 50.

As shown in FIG. 2, a gripping part 22 gripping the collimator and the light supplying part 30 are disposed on the inspection table 21. Although not shown, rollable wheels can be provided on the lower end of the inspection table 21. With the wheels, the collimator inspecting apparatus 20 can be easily moved to a position predetermined for inspection. In this case, braking devices can be separately provided to the rollable wheels, so as to prevent the inspecting apparatus 20 from being moved after being displaced to the predetermined position.

On opposite sides of the collimator 10, which is positioned in the gripping part 22, the light supplying part 30 and the light receiving part 40, respectively, are provided.

Figure 3:
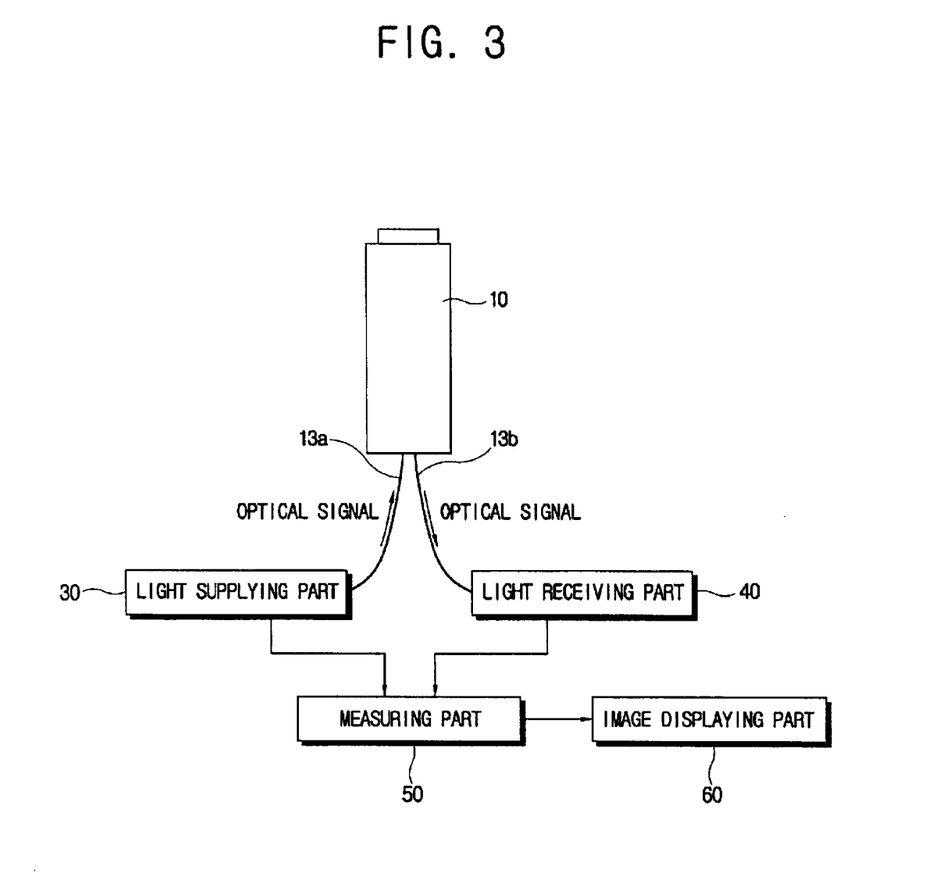
FIG. 3 is a schematic block diagram of the apparatus for inspecting the collimator, as shown in FIG. 2.

The light supplying part 30, as shown in FIG. 2, is connected to the first fiber 13a of the collimator 10. The light supplying part 30 generates an optical signal and the optical signal is transmitted to the first fiber 13a of the collimator 10 connected to the light supplying part 30. The light supplying part 30 is electrically connected to the measuring part 50 (to be described later and as shown in FIG. 3) and transmits a value corresponding to the optical signal transmitted to the first fiber 13a of the collimator 10.

The light receiving part 40, as shown in FIG. 2, is connected to the second fiber 13b of the collimator 10. The light receiving part 40 is electrically connected to the measuring part 50 (to be described later). The light receiving part 40 receives the optical signal, which entered the first fiber 13a of the collimator 10, reflected toward and then returned from the second fiber 13b after having passed through the pigtail 12 and the GRIN lens 14, which constitutes the collimator 10, and transmits a value corresponding to the received optical signal to the measuring part 50.

The measuring part 50 is electrically connected to the light supplying part 30 and the light receiving part 40, respectively, and receives a value corresponding to the optical signal transmitted to the collimator 10 from the light supplying part 30 and a value corresponding to the optical signal returned from the collimator 10 passing through the light receiving part 40. The measuring part 50 calculates the values of the optical signals, measures optical properties of the collimator 10, for example, return loss etc., and outputs the measured optical properties through the image displaying part 60 provided on the inspection table 21.

With this configuration, processes of operating the collimator inspecting apparatus 20 can be described as follows.

First, to measure a return loss of the collimator 10, the collimator 10, which is subject to inspection, is mounted on the gripping part 22, which is provided on the inspection table 21. At this time, a predetermined stopper (not shown) may be provided to the gripping part 22, so as to prevent a gripping position of the collimator 10 from varying.

After mounting the collimator 10 on the gripping part 22, the first fiber 13a of the collimator 10 is connected to the light supplying part 30, and the second fiber 13b of the collimator 10 is connected to the light receiving part 40.

If connection of the fibers 13a and 13b of the collimator 10 with the light supplying part 30 and the light receiving part 40, respectively, is completed, an optical signal is transmitted to the first fiber 13a through the light supplying part 30. In accordance with this, the optical signal entered the first fiber 13a of the collimator 10 passes through the pigtail 12 and the GRIN lens 14 comprising the collimator 10. However, if the optical signal transmitted to the first fiber is partially reflected by the pigtail 12 or GRIN lens 14 of the collimator, then an optical signal partially reflected by the pigtail 12 or GRIN lens 14 of the collimator 10 is returned to a second fiber 13b.

Figure 4:
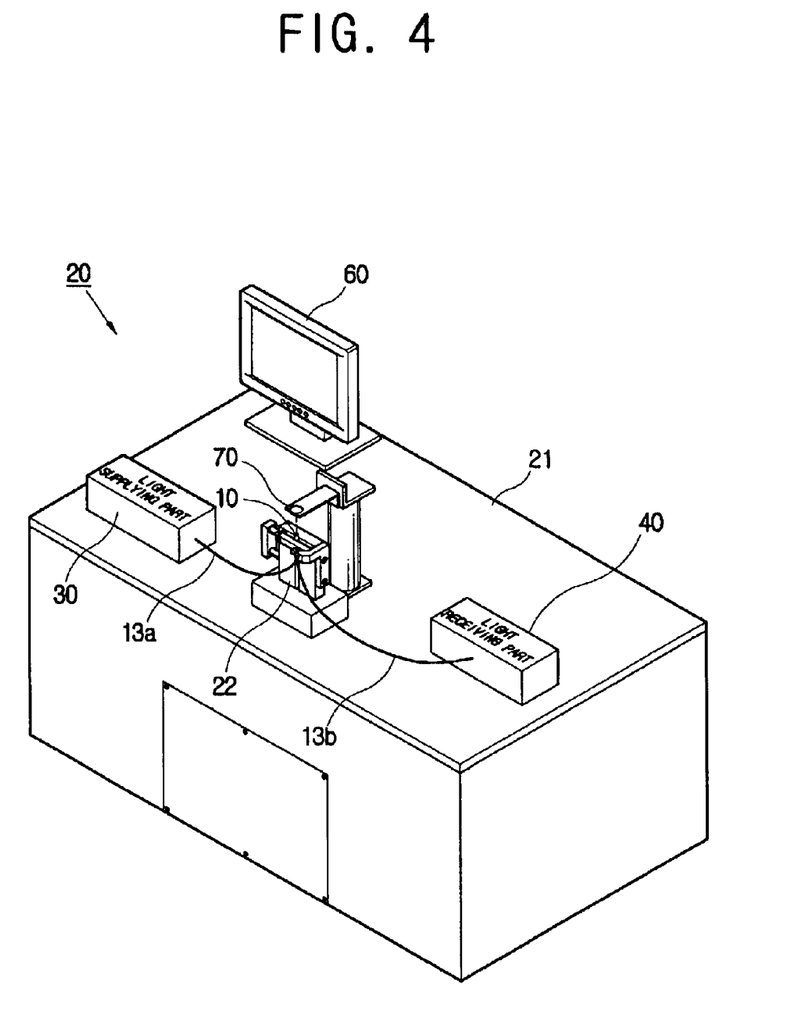
FIG. 4 is a perspective view of the apparatus for inspecting the collimator according to a second embodiment of the present invention.

Then the measuring part 50 electrically connected to the light supplying part 30 and the light receiving part 40 calculates an optical property of the collimator 10, such as return loss by deducting a value corresponding to the optical signal returned from the second fiber 13b from a value corresponding to the optical signal which entered the first fiber 13a of the collimator 10, and displays the value obtained from the calculation on the image displaying part 60 (see FIG. 3). Therefore, a worker is able to determine the optical property, i.e., return loss, based on a value outputted through the image displaying part 60, thereby providing a measure of a quality of the product.

Where a total reflection mirror 70, which totally reflects the entered optical signal, is further provided to the collimator inspecting apparatus 20, the total reflection mirror 70 being positioned coaxially relative to the collimator 10, with a predetermined distance over the collimator 10, another optical property, reflected insertion loss, can be measured. The total reflection mirror 70, as shown in FIG. 4, is coaxially positioned over the collimator 10, totally reflects the optical signal, which entered the collimator 10, and then returns the optical signal to the light receiving part 40 through the second fiber 13b of the collimator 10.

With this construction, a process of measuring one of the optical properties of the collimator, reflected insertion loss, in the collimator inspecting apparatus 20 can be described as follows. A collimator 10 subject to inspection is mounted on the gripping part 22 provided on the inspection table 21. After the collimator 10 is mounted on the gripping part 22, the first fiber 13a of the collimator 10 is connected to the light supplying part 30 and the second fiber 13b of the collimator 10 is connected to the light receiving part 40.

If connection of the fibers 13a and 13b of the collimator 10 to the light supplying part 30 and the light receiving part 40, respectively, is completed, the light supplying part 30 transmits an optical signal to the collimator 10 through the first fiber 13a. Accordingly, the optical signal, which entered the first fiber 13a of the collimator 10, passes through the pigtail 12 and the GRIN lens 14 with which the collimator 10 is formed, and then is transmitted to the total reflection mirror 70 formed over the collimator 10. The total reflection mirror 70 totally reflects the optical signal transmitted through the first fiber 13*a*, and then allows the reflected optical signal to be returned to the light receiving part 40 through the second fiber 13*b*.

Figure 5:
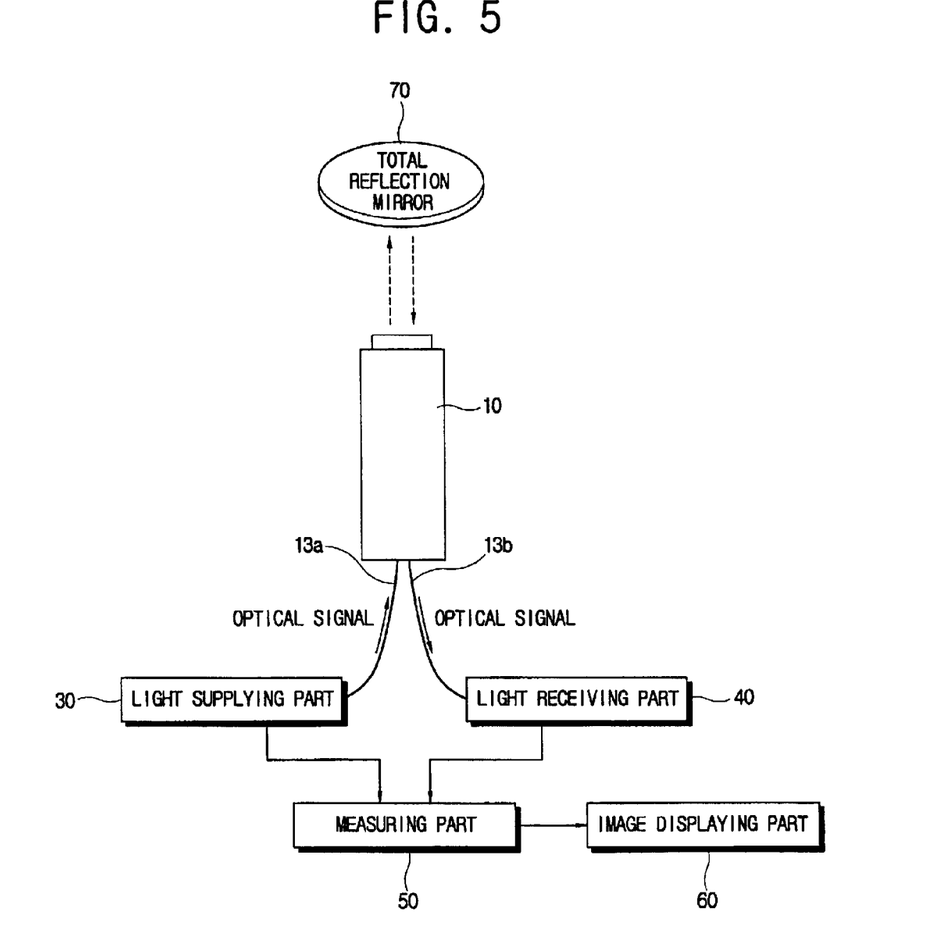
FIG. 5 is a schematic block diagram of the apparatus for inspecting the collimator, as shown in FIG. 4.

Accordingly, the measuring part 50, connected to the light supplying part 30 and the light receiving part 40 calculates an optical property, the reflected insertion loss, of the collimator 10, by deducting a value corresponding to the optical signal returned from the second fiber 13*b* from a value corresponding to the optical signal, which entered the first fiber 13*a* of the collimator 10, and outputs the obtained value through the image displaying part 60 (see FIG. 5). For example, if an optical signal of 100 db is supplied to the first fiber 13*a* from the light supplying part 30 and 98 db of the optical signal, which entered through the first fiber 13*a*, is returned to the light receiving part 40 through the second fiber 13*b*, after being totally reflected by the total reflection mirror 70, the measuring part 50 deducts the value corresponding to the latter from the value corresponding to the former, thereby outputting 2 db as a value of the returned insertion loss through the image displaying part 60. Therefore, a worker can determine the optical property (reflected insertion loss) of the collimator 10, based on the value displayed through the image displaying part 60, thereby providing a measure of the quality of the product.

Referring to the above description, the quality of a product can be accurately determined by an inspection apparatus 20 provided to allow the collimator 10 to be inspected, thereby increasing the product reliability of the collimator 10.

As described above, according to the present invention, there is provided a collimator inspecting apparatus. With the collimator inspecting apparatus, the collimator can be inspected in part, thereby increasing the product reliability of the collimator.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for inspecting optical properties of a collimator subject to inspection, wherein the collimator to be inspected includes a pigtail formed with first and second fibers, a GRIN lens disposed coaxially relative to the pigtail, and a glass tube supporting the pigtail and the GRIN lens in a single unit, the apparatus comprising:

an inspection table;

a gripping part provided on the inspection table, gripping the collimator subject to inspection;

a light supplying part transmitting a predetermined optical signal to the first fiber;

a light receiving part connected to the second fiber, receiving an optical signal returned from the second fiber, after the predetermined optical signal enters the first fiber;

a total reflection mirror positioned coaxially relative to the collimator subject to inspection at a predetermined distance from the collimator subject to inspection and totally reflecting the predetermined optical signal, which entered and then exited the first fiber, back to the collimator;

a measuring part calculating a first value corresponding to the predetermined optical signal, which entered the first fiber, and a second value, corresponding to the optical signal returned from the second fiber; and an image displaying part displaying the first value and the second value obtained from the measuring part.

2. The apparatus according to claim 1, wherein the measuring part deducts a value corresponding to a reflected optical signal returned from the second fiber after being totally reflected by the optical reflection mirror from the first value corresponding to the predetermined optical signal, which entered the first fiber, to obtain a value of reflected insertion loss.

3. A method of inspecting optical properties of a collimator, which collimator includes a pigtail formed with first and second fibers, a GRIN lens disposed coaxially relative to the pigtail, and a glass tube supporting the pigtail and the GRIN lens in a single unit, the method comprising:

transmitting a predetermined optical signal to the first fiber;

positioning a total reflection mirror coaxially relative to the collimator at a predetermined distance from the collimator;

totally reflecting the predetermined optical signal, which entered the first fiber and exited the collimator;

receiving an optical signal returned from the second fiber, after the transmitted predetermined optical signal entered the first fiber and exited the collimator;

calculating a value corresponding to the predetermined optical signal, which entered the first fiber, and a value corresponding to the optical signal returned from the second fiber; and displaying one or more of the calculated value corresponding to the predetermined optical signal, which entered the first fiber, the calculated value corresponding to the optical signal returned from the second fiber and a value calculated as a difference between the value corresponding to the predetermined optical signal and the value corresponding to the optical signal returned from the second fiber.

4. The method according to claim 3, wherein the calculating deducts the value corresponding to the optical signal returned from the second fiber from the value corresponding to the predetermined optical signal, which entered the first fiber, to obtain a value of reflected insert loss.

5. An apparatus for inspecting optical properties of a collimator, the collimator having a pigtail formed with first and second fibers, a GRIN lens disposed coaxially relative to the pigtail, and a glass tube supporting the pigtail and the GRIN lens in a single unit, the apparatus comprising:

a holding unit to hold the collimator;

a transmitting unit transmitting a predetermined optical signal to the first fiber;

a receiving unit connected to the second fiber, receiving an optical signal returned from the second fiber, after the predetermined optical signal enters the first fiber;

a total reflection mirror positioned coaxially relative to the collimator and totally reflecting the predetermined optical signal, which entered and then exited the first fiber, back to the collimator; and a processing unit calculating and displaying a first value corresponding to the predetermined optical signal, which entered the first fiber, and a second value corresponding to the optical signal returned from the second fiber.

6. The apparatus according to claim 5, wherein the processing unit deducts a value corresponding to a reflected optical signal returned from the second fiber after being totally reflected by the optical reflection mirror from the first value corresponding to the predetermined optical signal, which entered the first fiber, to obtain a value of reflected insertion loss.

7. A method of inspecting optical properties of a collimator, which collimator includes a pigtail formed with first and second fibers, a GRIN lens disposed coaxially relative to the pigtail, and a glass tube supporting the pigtail and the GRIN lens in a single unit, the apparatus comprising:

transmitting a predetermined optical signal to the first fiber;

totally reflecting the predetermined optical signal, which entered the first fiber and exited the collimator receiving an optical signal returned from the second fiber, after the transmitted predetermined optical signal entered the first fiber and is totally reflected;

calculating one or more values corresponding to the predetermined optical signal, which entered the first fiber, and a value corresponding to the optical signal returned from the second fiber; and displaying one or more of the calculated values corresponding to the predetermined optical signal, which entered the first fiber, the calculated value corresponding to the optical signal returned from the second fiber and a value calculated as a difference between the value corresponding to the predetermined optical signal and the value corresponding to the optical signal returned from the second fiber.

8. The method according to claim 7, wherein the calculating deducts the value corresponding to the optical signal returned from the second fiber from the value corresponding to the predetermined optical signal, which entered the first fiber, to obtain a value of return loss.

* * * * *

UNITED STATES PATENT AND TRADEMARK OFFICE
CERTIFICATE OF CORRECTION

PATENT NO. : 6,741,339 B2
DATED : May 25, 2004
INVENTOR(S) : Myeon-soon Hwang et al.

It is certified that error appears in the above-identified patent and that said Letters Patent is hereby corrected as shown below:

<u>Title page,</u>
Item [56], References Cited, U.S. PATENT DOCUMENTS, "5,004,346 A" reference, change "KuMichael" to -- Kühel --.

Signed and Sealed this

Thirtieth Day of November, 2004

JON W. DUDAS
*Director of the United States Patent and Trademark Office*